United States Patent

[11] 3,598,349

[72] Inventor King B. Drake
Los Angeles, Calif.
[21] Appl. No. 876,480
[22] Filed Nov. 13, 1969
[45] Patented Aug. 10, 1971
[73] Assignee Dracon Industries
Chatsworth, Calif.

[54] CABLE TROUGH
9 Claims, 5 Drawing Figs.

[52] U.S. Cl. .................................................. 248/49,
174/68 C, 174/72 A, 182/178, 182/228, 211/182,
248/68 R, 287/2, 287/127 R
[51] Int. Cl. ..................................................... H02g 3/04,
F16l 3/22
[50] Field of Search .......................................... 174/72 A,
68 C; 317/122; 248/49, 58, 68 R; 211/123, 182;
287/2, 127 R; 182/178, 207, 228; 52/637, 645,
690

[56] References Cited
UNITED STATES PATENTS
1,166,835 1/1916 Hogan .......................... 287/127
1,189,884 7/1916 Stratinsky ..................... 182/56
2,654,487 10/1953 Degener ....................... 182/178 X
2,833,421 5/1958 Skubic .......................... 211/182 X
3,406,932 10/1968 Burke ........................... 248/68
FOREIGN PATENTS
702,142 1/1965 Canada ......................... 174/68 C
741,980 12/1932 France ......................... 211/182
437,458 11/1967 Switzerland ................. 174/68 C OTHER REFERENCES
Tyrell, IBM Technical Disclosure Bulletin, " Wiring Ducts,"
Vol. 3, No. 10, March 1961, Page 5, copy in 174- 68(c).

Primary Examiner—Laramie E. Askin
Attorney—Allan M. Shapiro

ABSTRACT: A cable trough comprising hollow side rails and hollow crossbars, both rectangular in configuration, with the crossbars being edgewise arranged in the longitudinal direction of the side rails. One side surface of each of the crossbars is substantially flush with one edge of each of side rails so that a trough is formed on top of the crossbars and between the side rails. The crossbars may be telescoping for width adjustment. The side rails may be endwise joined with similar side rails by means of a connecting bar positioned within the hollow structure.

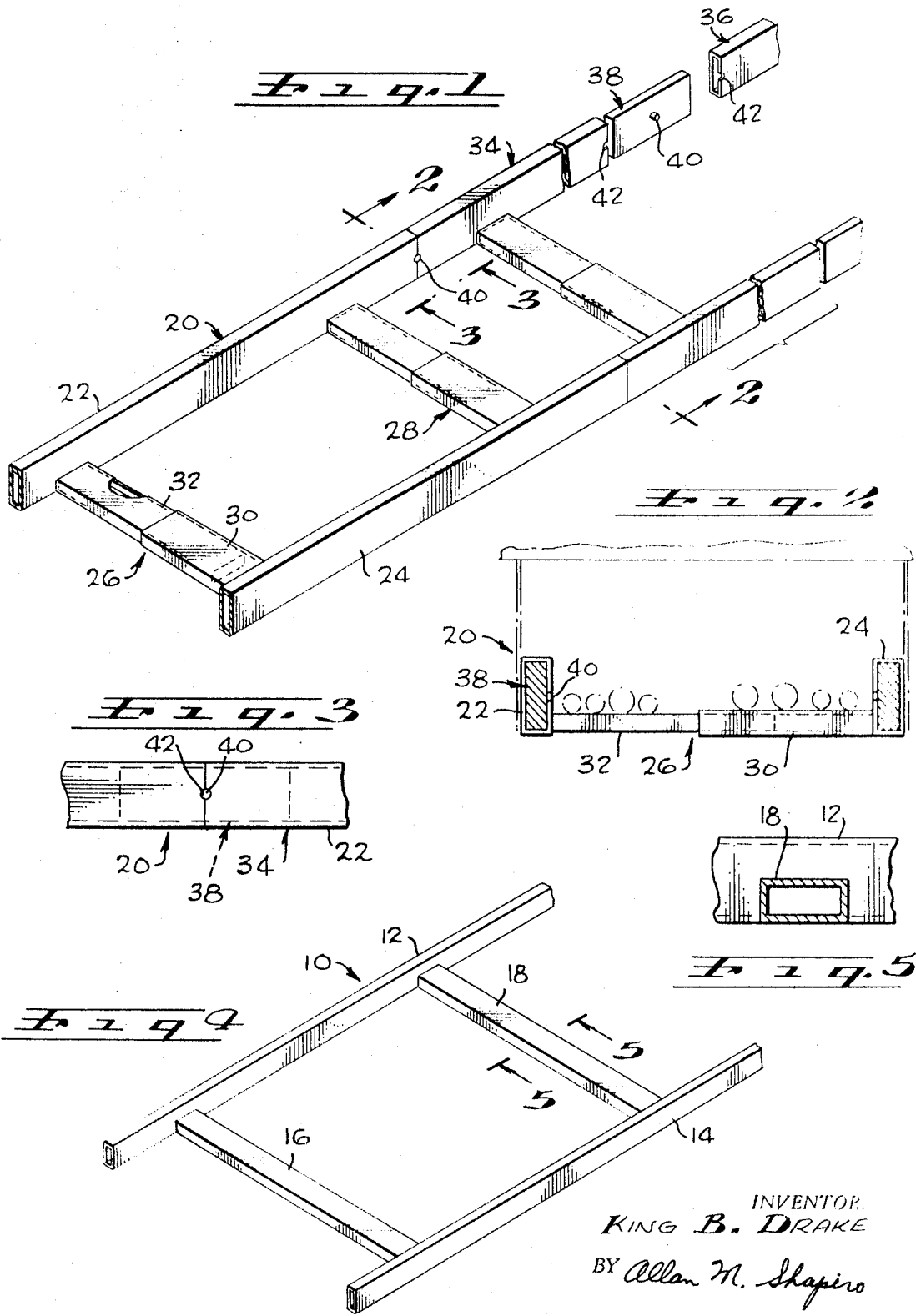
PATENTED AUG 10 1971
3,598,349
INVENTOR.
KING B. DRAKE
BY Allan M. Shapiro
ATTORNEY

CABLE TROUGH

BACKGROUND OF THE INVENTION

1. Field of the Invention

This invention is directed to cable troughs and, particularly, cable troughs which can be supported or suspended in building structures to carry cable thereon from one location to another within the building. Such cable troughs often are used for carrying telephone cables through the above-ceiling crawl space in office buildings.

2. Description of the Prior Art

The modern office building is based on flexibility. There must be complete flexibility of lighting and ventilation, and there must be complete flexibility in the location of user telephone equipment. As a result of this concept of flexibility, suspended ceilings are employed below poured concrete slab floors, and sufficient crawl space is provided therebetween for the running of these essential services. For example, this crawl space in a modern office building contains all the duct work for the distribution of temperature controlled, heated or cooled, as well as filtered air to the various office spaces. Where heating or cooling loads are different in different parts of the building, sufficient control of incoming air temperature through individual zoning is accomplished. Quite often, the crawl space acts as a return air plenum.

In addition to serving for electric power distribution for receptacles, electric powered machinery, and lighting, the crawl space also serves as the location for the cable network for the user telephone equipment. A small cable interconnects the local junction block and local equipment with each telephone handset. In view of the policy of the telephone companies to place a handset wherever desired by the customer, such cables must be able to be routed anywhere through the crawl space so that they can be brought down through any of the partitions in the building space. In the larger office buildings, there is local telephone equipment on each floor of the building. This local equipment provides the necessary relays, switching, pushbutton lighting and power for buzzer equipment as is necessary for handset equipment which is provided with multiline pushbuttons, hold buttons, communication lines, buzzers and the like. Even when the handset is a simple handset, a terminal board is provided for junction between the individual handset cable and the end of the cable extending from that junction out of the building. Thus, a small cable radiates from the terminal board and other equipment on each floor of the building to each of the handsets. If these individual cables were individually supported, the crawl space would soon become a spider web of cabling. Furthermore, a very large number of individual supports would be necessary, and all such telephone cable paraphernalia would interfere with location and maintenance of all the power and ventilation lines. Thus, a system of providing cable support structures has been accomplished in the past. One such structure has comprised ladderlike structures which include rectangular rails interconnected by rectangular rungs. The rails and rungs were each made of rectangular solid steel stock, with the longer dimension of the stock in both the rails and rungs at right angles to the general plane of the ladderlike structure. The ladderlike structure was supported in a generally horizontal plane, and cables were laid along the length of the structure to be supported upon the rungs. Connectors for sections of the ladderlike structures were developed which included devices which clamped around the outside of the rails for connection to other ladderlike structure, either extending in the same direction or at right angles thereto. One problem has been the tendency of the cables to roll off the ladderlike structure during cable installation, or subsequent thereto as upon occurrence of an earthquake, necessitating strapping the cables to each other and/or the structure. Also, in an effort to save weight, an improvement was attempted upon these ladderlike structures by making the rungs of channel material, the flanges of which have a tendency to cut the cable. Furthermore, whether made of solid or channel stock material, it has been extremely difficult for the installer to saw through the material, as when obtaining a fitted length in building installation, and to drill through the material for making holes necessary for attachment of conventional clamps and other associated hardware. Thus, previous attempts at providing cable supports have not provided the optimum structure which is the primary object and result of the present invention.

SUMMARY OF THE INVENTION

In order to aid in the understanding of this invention, it can be stated in essentially summary form that it is directed to a cable trough. The cable trough has two side rails, and a plurality of crossbars interconnecting the side rails. Both the side rails and crossbars are of rectangular hollow material to provide a desirable strength-to-weight ratio. Furthermore, the cross bars are laid so that the larger cross-sectional dimension extends in the longitudinal direction of the side rails, and lies so that a trough is formed between the top of the crossbars and the inside of the side rails. In one embodiment, the crossbars are telescopic so that widthwise adjustment of the trough is obtained. In another embodiment, a longitudinal connector is inserted into the ends of the side rails to join endwise abutting side rails of adjacent structures.

Accordingly, it is an object of this invention to provide a cable trough, which is of rectangular hollow stock of such dimension as to provide a satisfactory strength-to-weight ratio in a cable trough, suited for the retention of telephone cables. It is another object to provide a cable trough having side rails and crossbars, with the crossbars interconnecting the side rails and being positioned so that the side rails from a trough in which telephone cables can rest.

It is a further object to provide a cable trough having telescoping crossbars so that the widthwise dimension of the cable trough can be suitably adjusted.

It is still another object to provide telescoping crossbars so that side rails having different length crossbars can be employed together for selectable overall width of the cable trough.

A further object is the provision of a longitudinal connector insertable into the ends of hollow side rails for joining endwise abutting side rails of adjacent structures.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a perspective view, with parts broken away, sectioned, and partly exploded, showing a preferred embodiment of the cable trough of this invention.

FIG. 2 is an enlarged section taken generally along line 2-2 of FIG. 1, with a layer of telephone cables being indicated in broken lines.

FIG. 3 is an enlarged fragmentary elevational view taken generally in the direction of arrows 3-3 of FIG. 1.

FIG. 4 is a perspective view of another embodiment of the cable trough of this invention.

FIG. 5 is an enlarged fragmentary section taken generally along line 5-5 of FIG. 4.

DESCRIPTION OF THE PREFERRED EMBODIMENTS

Referring first to the embodiment shown in FIGS. 4 and 5, cable trough 10 is made up of side pieces or side rails 12 and 14, and a plurality of crossbars interconnecting the side rails. Two of the crossbars are shown at 16 and 18. The cable trough 10 is, thus, a ladderlike structure but is normally employed when it is oriented in the generally horizontal plane. Both of the side rails and all of the crossbars are made up of rectangular hollow stock. The stock is preferably of extruded nature, with the rectangle having unequal edge and side dimensions. All of the crossbars, of which crossbars 16 and 18 are exemplary, are cut to be of equal length and are arranged between the side rails in such a manner that their longer cross-sectional dimension is parallel to the longitudinal direction of the side rails, with one of the edges of each of the side rails in alignment with one of the sides of the crossbars. In other words, the bottom edges of the side rails and the bottom sides of the crossbars lie substantially in a common plane. When positioned in this manner, the various parts of the cable trough 10 are secured together, preferably as by welding, to form a sound structural unit having an overall U-shaped configuration for reception and retention of telephone cables laid thereon. The cable trough 10 is of suitable length for convenient handling, with a minimum of necessary end interconnections.

Cable trough 20 is illustrated in FIGS. 1, 2 and 3. Cable trough 20 is a more preferred embodiment than cable trough 10, not because of any strength condition but because of the additional flexibility features of the cable trough 20. Cable trough 20 has side pieces or side rails 22 and 24 and a plurality of crossbars, such as at 26 and 28. Side rails 22 and 24 are identical to their corresponding side rails 12 and 14 of trough 10 in that they are made out of hollow stock, preferably rectangular in form. Crossbars 26 and 28 are also made out of hollow stock, preferably rectangular in form, but are arranged so that they are telescopic. Crossbar 26 comprises receiver section 30 which is at least partially located in slider section 32. Slider section 32 is also preferably of hollow stock for proper strength-to-weight ratio. The telescoping relationship of receiver section 30 with its slider section 32, and the identical construction in crossbar 28, permits the side rails 22 and 24 to be positioned at different distances from each other and still be interconnected with crossbars. As indicated in FIGS. 1 and 2, there is considerable overall width adjustment with the receiver section 30 and slider section 32 still in sufficient interengagement to provide the necessary strength.

In addition to this overall width adjustment by different telescoping adjustments, further flexibility is obtained by providing one or the other of the side rails 22 and 24 with a standard length slider section 32 or receiver section 30, while the other is stocked in various lengths of its corresponding section of the crossbar. In other words, for example, side rail 24, with its receiver section 30, may be stocked with only one length of the receiver section 30; in such case, side rail 22, with its slider section 32, is stocked with several different lengths of the slider section 32, so that cable troughs can be assembled with selected overall width. By such arrangements, inventory of both the manufacturer and user is minimized for an adequate number of cable trough widths.

As is seen in FIGS 1 and 3, cable troughs 34 and 36 are also shown, in part, therein. Longitudinal connection of the cable troughs is accomplished by means of connector members 38. As is seen in FIGS 1, 2 and 3, connector members 38 are in the form of bars which have a rectangular external configuration of such size as to fairly firmly fit within the rectangular opening in the hollow side rails. This provides for longitudinal interconnection without external structure. Thus, connector members 38 do not interfere with hanging straps, cables or mounting supports of any kind. In order to maintain the connector members 38 at the longitudinally abutting juncture of adjacent side rails, each of the connector members is provided with a central lateral pin 40 to longitudinally position the members with respect to the side rails. If desired, semicircular cutouts 42 can be provided in the side rail ends to receive the pins 40 so that complete abutment of the side rails is accomplished. Furthermore, connector members 38 can be employed with the cable trough 10 of FIG. 4.

Both cable trough 10 and cable trough 20 are arranged so that the same hollow stock is employed for as many different parts as possible. In the cable trough 10, all parts are made out of the same stock. As is seen in FIG. 1, since slider section 32 must slide into receiver section 30, the slider 32 is made of smaller stock. However, side rails 22 and 24 are made out of the same size stock as section 30. This provides considerable economy in manufacturing. The cable trough 20 has its several parts secured together by welding, similar to the structure of FIG. 4. Both of the cable troughs 10 and 20 are completely compatible with all existing support and mounting hardware presently employed for cable ladders in the telephone industry.

When put into actual use, an appropriate width of cable trough is selected. Either the cable trough is a widthwise, rigid cable trough, as in FIG. 4, or it is a selected pair of side rails with their crossbars, with an appropriate selected width of the structure shown in FIG. 1. One section, as 20, of the cable trough is raised into place and secured, and the next section as 34, is engaged therewith in longitudinal abutment by employment of connector members 38. The cable troughs are connected lengthwise and are supported from the overhead, until the desired end is reached. Thereupon, the end is secured, even when a corner is built out of appropriate cable trough pieces. In any event, both ends of each string of cable trough are secured so that they cannot spread apart to lose the longitudinal connection by interengagement of the connector members 38. Connections for overhead support and for interlocks and connectors to other cable troughs can easily be secured to the cable trough of this invention because the hollow stock is of such nature that holes can easily be drilled into it, especially as compared to the solid bars of the prior art, or even the relatively solid rolled channels. Thus, holes are quickly and easily accomplished for all kinds of supports and connectors. After the installation is complete, as is indicated in broken lines in FIG. 2, the similarly indicated cables are laid on the crossbars between the side rails in the true trough that is formed, without the conventional necessity of strapping or wrapping the cables to each other and/or the rails to prevent their rolling off, as has been the case in the past, until a sufficient number of cables is used so as to exceed the retainable capacity of the trough. The relatively large crossbars in contact under the cables provide adequate support without cutting, notching or otherwise damaging the cables.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What I claim is:

1. A cable through comprising:
   a fist side rail;
   a second side rail;
   both said first and second side rails being made of tubular material of uniform cross section, said tubular material having a sectional configuration defined by a rectangle, having first and second equal sides and first and second equal edges, said sides being of greater dimension than said edges;
   said first and second side rails being positioned so that said first sides of said first and second side rails face each other and lie in substantially parallel planes, and being positioned so that said first edge on said first side rail and said first edge on said second side rail lie in a first common plane while said second edge on said first side rail and said second edge on said second side rail lie in a second plane parallel to said first plane;
   a plurality of crossbars, each of said crossbars being secured at one end to said first side of first rail and at the other end to said first side of said second rail, each of said crossbars being tubular, and having an exterior rectangular configuration, at least part of each of said crossbars being of the same cross-sectional dimensions as said first and second side rails so that said crossbars have sides and edges with said sides of said crossbars being of larger dimension than said edges of said crossbars, said cross bars being connected to both said first and second side rails so that one side of each of said crossbars lies in said first plane defined by said first edges of said first and second rails so that at least a part of each of said crossbars lies coplanar in said first plane.

2. The cable trough of claim 1 wherein each of said crossbars is a unitary structure and is of the same cross-sectional dimensions as said side rails throughout the entire length of said crossbars, said crossbars being secured to said side rails by welding.

3. The cable trough of claim 2 wherein first and second cable trough sections are arranged in endwise abutting aligned relationship of said cable trough side rails, a connector member inserted within the hollow interior of the ends of each of said endwise abutting side rails to maintain said endwise abutting side rails in alignment.

4. The cable trough of claim 3 wherein said connector member has a pin extending laterally therefrom, said pin engaging said endwise abutting side rails to maintain said connector member engaged in both of said endwise abutting side rails.

5. The cable trough of claim 1 wherein said crossbars each comprise first and second telescoping crossbar sections, said first crossbar sections being connected to said first side rail and said second crossbar sections being connected to said second side rail.

6. The cable trough of claim 5 wherein both said first and second crossbar sections are hollow and rectangular in cross section.

7. The cable trough of claim 6 wherein said second crossbar sections are formed of the same stock as said second side rail, and said first crossbar sections are formed of stock of such dimension as to telescope into the interior of said second crossbar sections.

8. The cable trough of claim 7 wherein first and second cable trough sections are arranged in endwise abutting aligned relationship of said cable trough side rails, a connector member inserted within the hollow interior of the ends of each of said endwise abutting side rails to maintain said endwise abutting side rails in alignment.

9. The cable trough of claim 8 wherein said connector member has a pin extending laterally therefrom, said pin engaging said endwise abutting side rails to maintain said connector member engaged in both of said endwise abutting side rails.